United States Patent [19]
O'Neill

[11] Patent Number: 5,522,576
[45] Date of Patent: Jun. 4, 1996

[54] APPLIANCE MOUNTING DEVICE

[76] Inventor: Edward L. O'Neill, 14284 Aculpulco Rd., San Leandro, Calif. 94577

[21] Appl. No.: 188,472

[22] Filed: Jan. 27, 1994

[51] Int. Cl.[6] ........................................ A47F 5/00
[52] U.S. Cl. ........................ 248/289.11; 248/220.22; 248/222.12
[58] Field of Search ...................... 248/278, 282, 248/285, 289.1, 290, 220.2, 224.4, 320, 324, 342, 241, 343, 339, 558, 222.12; 211/96; 403/164, 165, 261, 245

[56] References Cited

U.S. PATENT DOCUMENTS

| | | |
|---|---|---|
| 167,118 | 8/1875 | Pritchett . |
| 190,497 | 5/1877 | Kelly ................................ 248/289.1 X |
| 1,318,703 | 10/1919 | Stuchlak . |
| 1,460,928 | 7/1923 | Tilden . |
| 2,408,703 | 10/1946 | Talge et al. ............................ 248/285 |
| 2,557,766 | 6/1951 | Ronfeldt . |
| 2,584,035 | 1/1952 | Lendle ..................................... 224/18 |
| 2,598,502 | 5/1952 | Butler ................................. 211/96 X |
| 2,877,073 | 3/1959 | Malmer . |
| 2,914,661 | 11/1959 | Winkler ................................. 248/324 |
| 2,967,040 | 1/1961 | Picha ..................................... 248/324 |
| 3,157,379 | 11/1964 | Platakis ................................. 248/278 |
| 3,291,432 | 12/1966 | Lucasey . |
| 3,423,057 | 1/1969 | Iverson ............................... 248/285 X |
| 3,724,798 | 4/1973 | Lucasey ................................. 248/418 |
| 3,787,131 | 1/1974 | Reachek ................................. 403/234 |
| 3,799,489 | 3/1974 | Goerditz ................................. 248/480 |
| 4,358,214 | 11/1982 | Shull .................................... 403/234 |
| 4,386,870 | 6/1983 | Baroody ................................. 403/234 |
| 4,410,158 | 10/1983 | Maffei .................................... 248/214 |
| 4,413,868 | 11/1983 | Gorkiewicz ........................ 248/282 X |
| 4,487,389 | 12/1984 | Ziegler .................................... 248/282 |
| 4,603,996 | 8/1986 | Chen ......................................... 403/7 |
| 4,650,144 | 3/1987 | Conrad .................................... 248/290 |
| 4,662,591 | 5/1987 | Encontre ................................ 248/188 |
| 4,739,637 | 4/1988 | Finkel et al. ............................. 70/58 |
| 4,836,486 | 6/1989 | Vossoughi et al. ................... 248/281.1 |
| 4,921,370 | 5/1990 | Handler et al. ......................... 403/234 |
| 5,127,617 | 7/1992 | Bergetz ................................... 248/278 |
| 5,165,644 | 11/1992 | Allen ...................................... 248/285 |
| 5,383,636 | 1/1995 | Karl ........................................ 248/278 |

Primary Examiner—Alvin C. Chin-Shue
Assistant Examiner—Korie H. Chan
Attorney, Agent, or Firm—Niro, Scavone, Haller & Niro

[57] ABSTRACT

An appliance mounting device which has an arm made from a pipe that has an attached stop and a first retainer opposingly located from a second retainer. The retainers are mountable to a surface and the device is assembled by inserting the arm through an aperture in the first retainer and positioned so that the arm and stop can be lowered until the stop is locked into place by the second retainer.

15 Claims, 2 Drawing Sheets

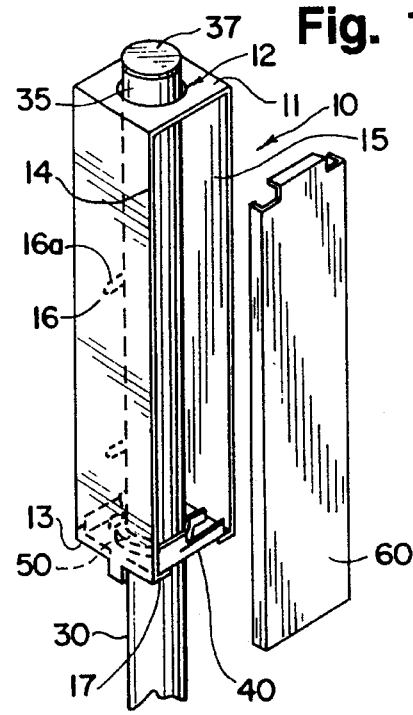
Fig. 1
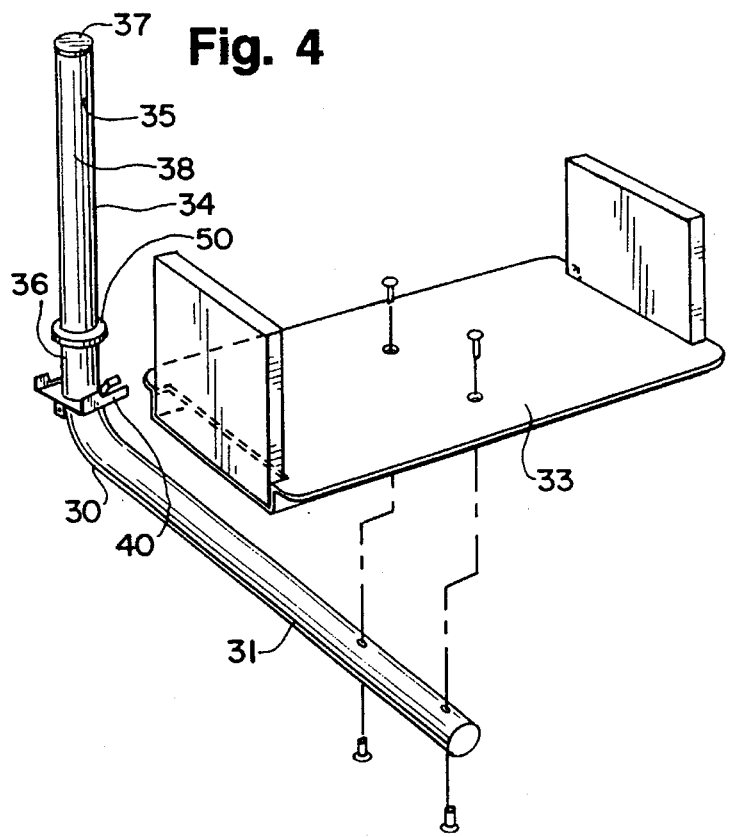
Fig. 4
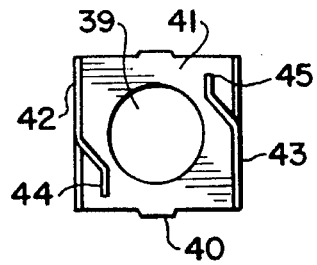
Fig. 5
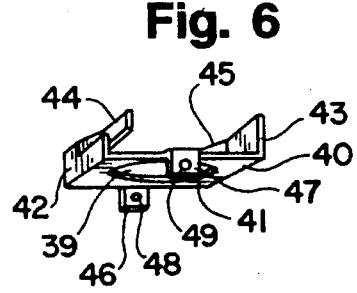
Fig. 6
Fig. 2
Fig. 3

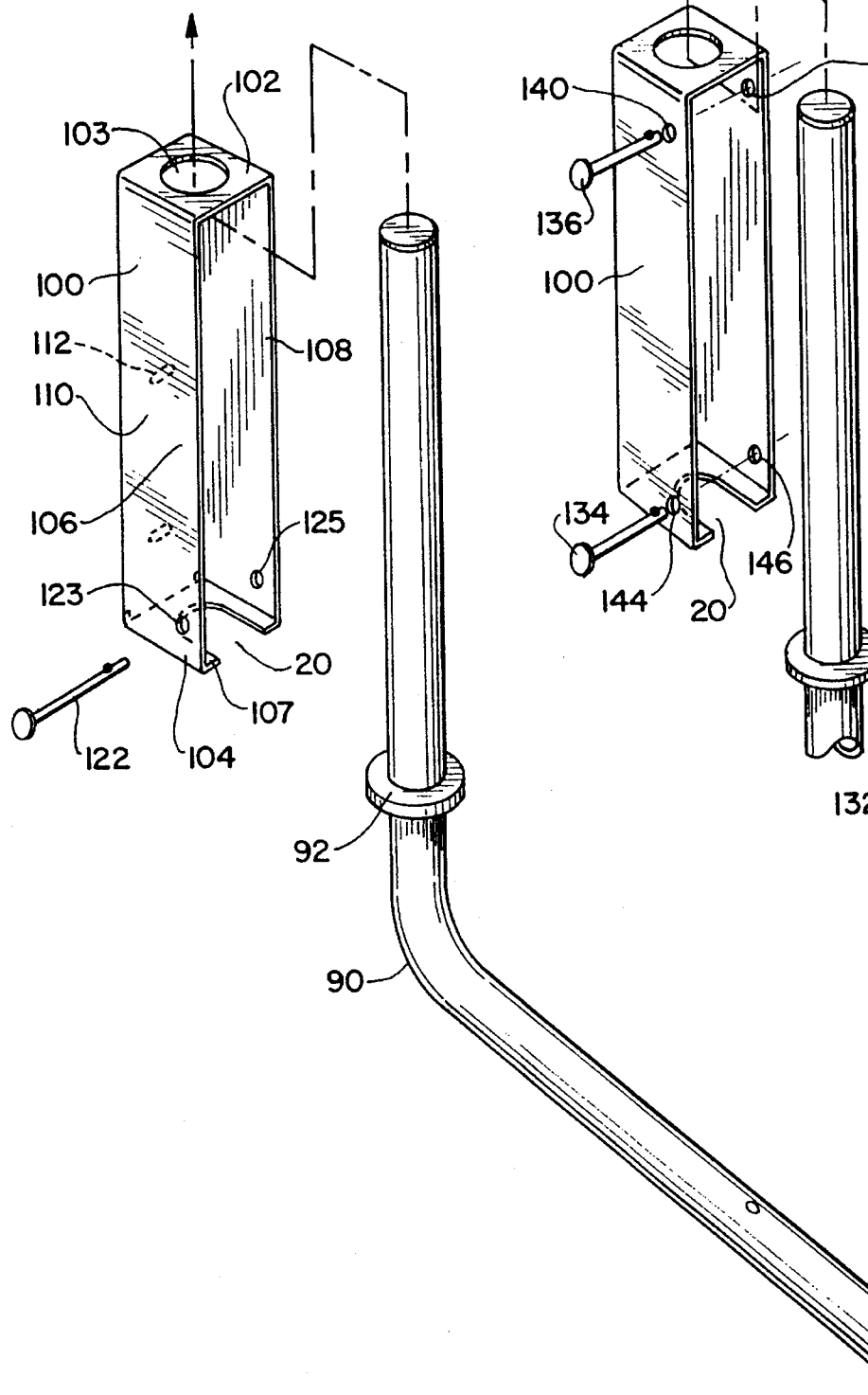

5,522,576

APPLIANCE MOUNTING DEVICE

BACKGROUND AND SUMMARY OF THE INVENTION

The present invention relates generally to a device for mounting an electrical appliance such as a television, radio, and the like to a surface such as a wall or ceiling. More specifically, the device relates to an improved device for mounting an arm, which further supports the appliance, to a wall or other surface.

As shown in U.S. Pat. No. 5,127,617 to Bergetz, mounting assemblies typically function by first securing the appliance to a support means which is attached to an arm which is, in turn, secured to a mounting means which has been attached to a surface. Generally, the arm first passes through a lower bracket and then an upper bracket. Once the arm passes through the upper bracket, the assembly must be suspended until a cotter pin is inserted through the arm or a flange is attached. The appliance and arm are then lowered until the pin or flange engages and comes to rest on the top bracket. This secures the entire assembly by preventing any further downward movement. The arm may also be fabricated from a pipe, which allows the entire assembly to pivot in a circular path.

Since the assembly must be suspended in an unlocked position, two persons are generally required to perform this task: one to hold the assembly in a suspended position, the other to insert the pin or attach the flange. By contrast, my invention simplifies the installation procedure by providing an arm that has a pre-attached stop. During installation, the arm is first inserted through an upper retainer and then the arm is lowered until the stop engages the lower retainer which prevents any further downward movement. By locating the locking function on the second retainer, the need to suspend the assembly before locking is eliminated, which makes the assembly of my invention by one person possible. My invention also reduces the cost of manufacture. By using fewer pieces in the mount's construction a savings in the amount of materials used and lower labor costs are realized.

Accordingly, it is an object of my invention to provide a mount which includes an arm with a pre-attached stop that facilitates the ease of use and reduces the difficulty of locking the assembly to a mount. It is a further object of my invention to provide a mount which is more economical to manufacture.

BRIEF DESCRIPTION OF THE DRAWINGS

FIG. 1 is a partial perspective view of the preferred embodiment in a locked position.

FIG. 2 is a perspective view of the arm being inserted into the aperture of the first retainer.

FIG. 3 is a perspective view showing how the keeper engages the second retainer.

FIG. 4 is a perspective view showing the keeper before it is locked to the stop located on the arm.

FIG. 5 is a plan view of the keeper.

FIG. 6 is a side view of the keeper.

FIG. 7 is a perspective view of an embodiment that uses a pin as a locking means and that does not require the use of a keeper.

FIG. 8 is a perspective view of an embodiment that uses a plate or tab which has been attached to the cover as the locking means and does not require the use of a keeper.

DETAILED DESCRIPTION OF PREFERRED EMBODIMENT

FIG. 1 is a perspective view of my invention in a locked position. The device comprises a housing 10, arm 30, keeper 40 and stop 50 which may be an annular flange that is axially disposed on arm 30. Housing 10 includes a first retainer 11 having aperture 12 and opposingly located second retainer 13 having a slot 20 which is configured to permit the transverse insertion and removal of arm 30 and is sized to permit the longitudinal movement of arm 30. Both retainers are connected to opposing side walls 14 and 15 as well as back wall 16 with apertures 16a for mounting housing 10 to a surface. Second retainer 13 further includes retaining edge or shoulder, 17 which contains slots 18 and 19.

Although the first and second retainers form opposing ends of an integrate of housing 10 in the preferred embodiment, an alternate embodiment could include retainers that are separate and discrete structures. By adapting each retainer to be mountable to a surface, the same objects and advantages of my invention can be achieved without the use of a housing. Such an embodiment may be useful in situations where a housing is not desired or where it would be impractical to manufacture a housing.

Arm 30 is typically made from a pipe which allows it to pivot move, or rotate in an arcuate path positioned in the retainers. As shown in FIG. 4, arm 30 is typically bent into a cantilevered shape which results in the formation of an appliance support end 31, to which an appliance support means 33 is attached and opposing mounting end 34 which terminates in free end 3. Mounting end 34 is further divided into a first portion 35 and a second portion 36. Stop 50 is attached to second portion 36 and is spaced from free end 37 whereby it defines an arm segment 38 having a fixed length. Stop 50 may also be a ring that has been welded to arm 30, but it may also be attached by any other mechanical fastening means.

Keeper 40, as shown in FIGS. 4 and 5, includes aperture 39 and plate 41 which has formed from it two opposing side flanges 42 and 43. Flanges 42 and 43 further include clips 44 and 45, which maintain keeper 40 and stop 50 together in assembled adjacent relation. Also formed from plate 41 are two opposing downwardly directed tabs or flanges 46 and 47 which include holes 48 and 49.

In operation, once housing 10 is secured to a surface the preferred embodiment is assembled by inserting arm 30 into aperture 39 of keeper 40 and positioning keeper 40 next to stop 50. Clips 44 and 45 are then placed over stop 50 maintaining the adjacent relation keeper 40 and stop 50. Next, appliance support means 33 is secured to arm 30 and then an appliance is attached.

Arm 30 and the attached appliance are then lifted and first portion 34 of arm 30 is inserted into aperture 12 of first retainer 11 of housing 10, which has been sized to receive free end 37 thereby permitting longitudinal movement while restraining arm movement. Arm 30 is next placed into a position where arm 30, keeper 40, and stop 50 may be then transversely inserted into slot 20 of second retainer 13 and then lowered as a unit. Since second retainer 13 has been spaced from first retainer 11 a distance less than arm segment 38, upon lowering, plate 41 contacts retaining edge or shoulder 17 and keeper 40 provides a bearing surface between shoulder 20 and stop 50 that prevents any further downward movement of arm 30 any further downward movement of arm 30. At the same time, tabs 46 and 47 run through slots 18 and 19 which inhibit horizontal movement. Locking pins (not shown) or some other type of mechanical fastening means are then placed through holes 48 and 49 which lock arm 30 and keeper 40 into place and generally prevent any upward movement while still permitting arm 30 to rotate within the retainers when the lock is actuated. Since housing 10 may be configured to have an open side which permits receipt of arm 30, a cover 60 may be placed on housing 10 to cover the working mechanisms and to present a more attractive device.

An alternate embodiment is shown in FIGS. 7 and 8. This embodiment comprises arm 90 with attached stop 92 and housing 100. As described above, arm 90 is a cantilevered pipe that is made and operates in the same manner as arm 30 which was previously described. Housing 100 further includes first retainer 102 containing aperture 103 and opposingly located second retainer 104 which are connected by opposing sidewalls 106 and 108. Connected to both retainers and sidewalls is backwall 110, which includes apertures 112 for securing housing 110 to a surface. Second retainer 104 further includes retaining edge or shoulder 107, which is sized to allow passage of arm 90 and block the passage of stop 92 by abuttingly engaging stop 92.

Housing 100 further includes a locking means, which is shown as pin 122 and apertures 123 and 125 in FIG. 7. Another locking means could be a plate may be a plate, tab, or some other type of extended projection 132 which is integral with or attached to cover 130. As shown in FIG. 8, plate 132 is adapted to fit around arm 90 yet cover stop 92.

The assembly and operation of this embodiment is virtually identical to the assembly and operation of the embodiment described above. Arm 90 is first inserted through aperture 103, which prevents any horizontal movement of arm 90. Arm 90 and stop 92 are then positioned and lowered down onto retaining edge 107, which prevents any further downward movement of arm 90 and stop 92.

In the embodiment using pin 122 as a locking means, pin 122 is inserted into apertures 123 and 125 located on housing 100. It is necessary to position apertures 123 and 125 so that when pin 122 is inserted, it comes into close proximity with an outer edge of arm 90 and upper surface of stop 92 so as to prevent any unwanted upward and horizontal movement of arm 90 and stop 92.

In the embodiment in which the locking means is plate 132 located on cover 130, it is necessary to form a semicircular aperture 136 that is slightly larger than arm 90 yet smaller than stop 92. Such a configuration, once properly positioned over stop 92 and against arm 90, prevents any vertical and horizontal movement that could disengage the device. Cover 130 and plate 132 are then locked into place by pins 134 and 156 which can be inserted through apertures 140, 142,144 and 146, all of which are located in housing 100.

It should be understood that various changes and modifications to the preferred embodiment described would be apparent to those skilled in the art. Changes and modifications can be made without departing from the spirit and scope of the present invention and without diminishing its intended advantages. It is, therefore, intended that such changes and modifications be covered by the following claims.

What is claimed is:

1. An appliance mounting apparatus, comprising:

an arm having an appliance supporting end portion and a mounting end portion terminating in a free end;

a stop fixedly secured to the mounting end portion of the arm and spaced from the free end thereby defining an arm segment having a fixed length;

a first retainer having an aperture sized to receive the free end of said arm and to permit longitudinal arm movement therein while restraining transverse arm movement;

a second retainer spaced from said first retainer a distance less than the length of said arm segment and having a slot configured to permit transverse insertion of the arm into the second retainer and sized to permit longitudinal arm movement, said second retainer also having a shoulder to prevent said arm stop from sliding through said slot and to thereby support said arm and said appliance;

a lock actuatable to maintain said arm stop in abutting relation with the shoulder of said second retainer; and said arm being rotatable within said first and second retainers when said lock is actuated.

2. The appliance mounting apparatus of claim 1 wherein said first and second retainers comprise opposing ends of an integral housing.

3. The appliance mounting apparatus of claim 2 wherein said housing has an open side for receipt of said arm, and further comprising a cover for said open side, said cover having an extended projection comprising said lock.

4. The appliance mounting apparatus of claim 1 further comprising a keeper disposed around said arm and positioned between said arm stop and said second retainer shoulder, said keeper having a configuration to permit engagement with said second retainer and to thereby restrain transverse arm movement.

5. The appliance mounting apparatus of claim 4 wherein said keeper includes stop engaging clips to maintain the keeper and stop in assembled adjacent relation.

6. The appliance mounting apparatus of claim 4 wherein the mounting end portion of said arm is tubular and said stop comprises an annular flange, said arm being thereby rotatable within said first and second retainers, and said keeper provides a bearing surface between said stop and said shoulder of said second retainer.

7. The appliance mounting apparatus of claim 4 wherein said keeper includes at least one longitudinally extending flange and said second retainer includes at least one additional corresponding slot for receiving said flange, and said lock engages said at least one flange.

8. An appliance mounting apparatus comprising:

a pivotal arm having a support end adapted to receive an appliance support and an opposing mounting end having a first and second portions;

a stop axially disposed on said arm near said second portion;

a keeper axially disposed over said arm and adapted to maintain adjacent relation to said stop;

a first mounting retainer having an aperture for receiving said first portion of said arm;

a second mounting retainer opposingly located from said first retainer, said second retainer having a slot which forms a shoulder on said second retainer, said slot permits transverse insertion and removal of said arm and sized to permit longitudinal arm movement; and said shoulder abuttingly engageable with said keeper whereby said keeper is positioned between said shoulder and stop in order to support said arm and appliance.

9. The appliance mounting apparatus of claim 8 wherein said keeper further includes two opposing side flanges forming clips that maintain the adjacent relation of said keeper with said stop.

10. The appliance mounting apparatus of claim 9 wherein said keeper has at least one downwardly directed tab and said shoulder of said second retainer includes at least one additional slot to receive said tab of said keeper.

11. The appliance mounting apparatus of claim 10 wherein said downwardly directed tab of said keeper includes an aperture for preventing the disengagement of said keeper and said second retainer.

12. The appliance mounting apparatus of claim 8 further comprising a single mountable housing having opposing side walls and a backwall which are connected to said opposing first and second retainers.

13. An appliance mounting apparatus, comprising;

a housing having opposing side walls, a back wall mountable to a surface, and opposingly located first and second retainers;

a rotatable arm having an appliance supporting end portion and a mounting end portion terminating in a free end;

a stop fixedly secured to the mounting end portion and spaced from said free end portion thereby defining an arm segment having a fixed length;

an aperture located on said first retainer, said aperture sized to receive the free end of said arm and to permit longitudinal arm movement therein while restraining transverse arm movement;

said second retainer spaced from said first retainer a distance less than said arm segment and having a slot configured to permit the transverse insertion of said arm into said second retainer and sized to permit longitudinal arm movement, said second retainer also having a shoulder adapted to prevent said stop from sliding through said slot and to thereby support said arm and said appliance; and a cover mountable to said housing and adapted to lock said arm in abutting relation with said second retainer.

14. The appliance mounting device of claim 13 wherein said cover includes an extended projection.

15. The appliance mount device of claim 14 wherein said projection is integral with said cover.

* * * * *